United States Patent [19]

Kuwagaki et al.

[11] 4,374,610
[45] Feb. 22, 1983

[54] DISH SHAPED SUBSTRATE FOR ELECTROCHROMIC DISPLAYS

[75] Inventors: Hiroshi Kuwagaki, Kyoto; Kozo Yano, Tenri; Sadatoshi Takechi, Nara, all of Japan

[73] Assignee: Sharp Kabushiki Kaisha, Osaka, Japan

[21] Appl. No.: 305,203

[22] Filed: Sep. 24, 1981

Related U.S. Application Data

[63] Continuation of Ser. No. 84,433, Oct. 12, 1979, abandoned, which is a continuation of Ser. No. 817,265, Jul. 20, 1977, abandoned.

[30] Foreign Application Priority Data

Jul. 23, 1976 [JP] Japan ............................ 51-88572
Sep. 3, 1976 [JP] Japan ......................... 51-119739[U]
Jun. 13, 1977 [JP] Japan .......................... 52-77554[U]

[51] Int. Cl.³ ............................................. G02F 1/17
[52] U.S. Cl. .................................... 350/357; 350/344
[58] Field of Search ..................... 350/357, 355, 344

[56] References Cited

U.S. PATENT DOCUMENTS

| | | | |
|---|---|---|---|
| 3,771,855 | 11/1973 | Burns | 350/344 |
| 3,879,108 | 4/1975 | Berets | 350/357 |
| 3,912,368 | 10/1975 | Ponjee et al. | 350/357 |
| 4,039,253 | 8/1977 | Jain | 350/357 |
| 4,070,749 | 1/1978 | Misono et al. | 53/404 |

Primary Examiner—James W. Davie
Attorney, Agent, or Firm—Birch, Stewart, Kolasch & Birch

[57] ABSTRACT

An electrochromic display comprises an electrochromic material held in two electrode carrying substrates to manifest reversible variations in the light absorption properties upon application of a predetermined voltage to the electrodes. At least one of the two substrates is dish shaped to accurately determine the distance between the electrodes formed on the two substrates. In a preferred form, grooves are formed at the periphery, or, the raised portion of the dish shaped substrate into which conductive material is introduced to facilitate the electrical connection between the dish shaped substrate and the counter substrate, whereby terminals for the dish shaped substrate are formed on the counter substrate. Another groove is formed at the periphery, or, the raised portion of the dish shaped substrate, through which an electrolyte is impregnated into the cavity defined by the two substrates.

1 Claim, 10 Drawing Figures

DISH SHAPED SUBSTRATE FOR ELECTROCHROMIC DISPLAYS

This application is a continuation of copending application Ser. No. 84,433, filed on Oct. 12, 1979, now abandoned, which in turn is a continuation of application Ser. No. 817,265, filed July 20, 1977, now abandoned.

BACKGROUND AND SUMMARY OF THE INVENTION

The present invention relates to a construction of a cell for an electro-optical display containing an electrochromic material held in two electrode carrying substrates to manifest reversible variations in the light absorption properties upon application of a predetermined voltage to the electrodes.

The present invention relates, more particularly, to the construction of a substrate for use in an electrochromic display device.

An electrochromic material is one in which the color is changed by the application of an electric field or current. See, for example, L. A. Goodman, "Passive Liquid Displays", RCA Report 613258.

There are two types of electrochromic displays (referred to as ECD hereinafter). The first type of ECD includes an inorganic solid film formed on electrodes, which produces color variations due to a change in the capacity. The second type of ECD utilizes an electrically-induced chemical reduction of a colorless liquid to produce a colored, insoluble film on a cathode surface.

In the conventional ECD, two plate shaped substrates are employed, on which electrodes are formed. The two plate shaped substrates are attached to each other by a spacer. Therefore, the fabrication of the ECD is very complicated, and it is very difficult to accurately determine the distance between the two plate shaped substrates.

Accordingly an object of the present invention is to provide an electrochromic display which ensures stable operation.

Another object of the present invention is to provide a novel substrate for use in an electrochromic display device.

Still another object of the present invention is to facilitate the fabrication of the electrochromic display cell.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, at least one substrate carrying on electrode is dish shaped to accurately determine the distance between the electrodes formed on the two substrates. The two substrates are attached to each other at their periphery, or, the raised portion of the dish shaped substrate.

In a preferred form, grooves or indented portions are formed at the periphery, or, the raised portion of the dish shaped substrate into which conductive material is introduced to facilitate the electrical connection between the dish shaped substrate and the counter substrate, whereby terminals for the dish shaped substrate are formed on the counter substrate. Another groove is formed at the periphery, or, raised portion of the dish shaped substrate, through which an electrolyte is impregnated into a cavity defined by the two substrates.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Referring now in detail to the drawings, and to facilitate a more complete understanding of the present invention, basis structures of a solid state ECD and a liquid state ECD will be first described with reference to FIGS. 1 and 2.

Figure 1:
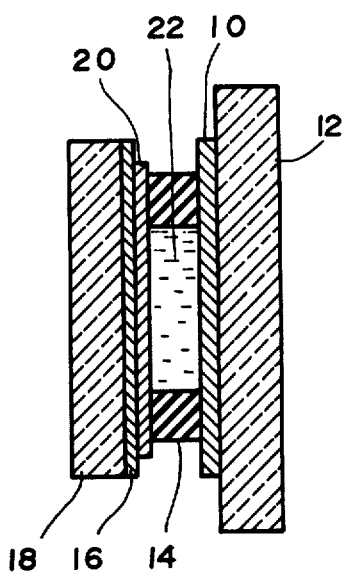
FIG. 1 is a cross-sectional view of a basic structure of a solid state ECD.

FIG. 1 shows a basic structure of a solid state ECD, wherein the color variation is produced by the change in the capacity of an inorganic solid film such as a transition metal oxide film attached to display electrodes.

A counter electrode is denoted as 10. This is made of a indium oxide transparent, electrically conducting film (obtainable through the conventional vacuum evaporation method) or an NESA film ($S_nO_2$; obtainable through the conventional vacuum evaporation method or spray method) in case of transmission mode. This may be substituted by a layer of noble metal materials such as graphite, platinum and palladium. A substrate 12 may be formed of glass, plastics, metal, ceramics, etc.

The ECD cell further comprises a spacer 14, a transparent electrode 16, a glass substrate 18, an inorganic film 20 which exhibits the electrochromic phenomenon, and an electrolyte 22.

The inorganic film 20 most commonly used for electrocoloration is tungsten oxide ($WO_3$) with a thickness of about 1 $\mu$m. The electrolyte 22 is a mixture of sulfuric acid, an organic alcohol such as glycerol, and a fine white powder such as $T_iO_2$. The alcohol is added to dilute the acid and the pigment is used to provide a white reflective background for the coloration phenomenon.

The amorphous $WO_3$ film 20 is colored blue when the transparent electrode 16 is made negative with respect to the counter electrode 10. The applied voltage is several volts. The blue color is diminished or bleached and the $WO_3$ film 20 returns to the transparent condition when the polarity of the applied voltage is reversed. This is termed bleaching.

The coloration of the film apparently is produced by the injection of electrons and protons into the $WO_3$ film. The bleaching occurs because the electrons and protons are returned to their respective starting conditions when the polarity is reversed. The colored condition can be maintained for days after removal of the coloration voltage as long as the bleaching voltage is not applied. This is termed memory function.

Figure 2:
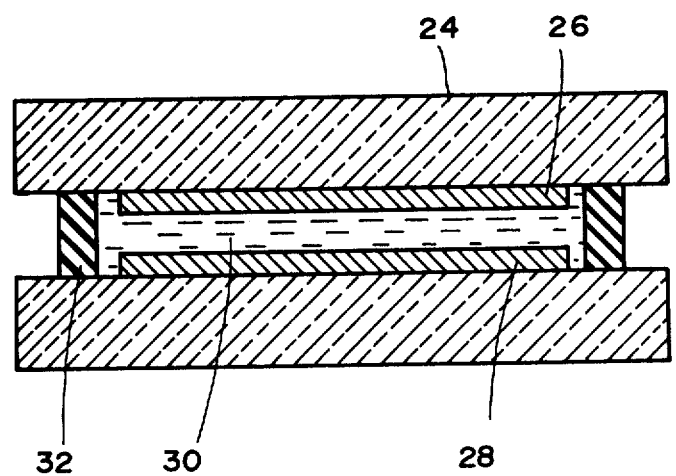
FIG. 2 is a cross-sectional view of a basic structure of a liquid state ECD.

FIG. 2 shows a basic structure of a liquid state ECD, which utilizes an electrically-induced chemical reduction of a colorless liquid to produce a colored, insoluble film on the cathode surface. In the absence of oxygen, the colored film remains unchanged as long as no current flows. However, the coloration will disappear gradually in the presence of oxygen. This is termed fading. Reversing the voltage causes the film to dissolve into the liquid with the concurrent erasure of the color. The colorless liquid that has met with the success so far is an aqueous solution of the conducting salt, KBr, and an organic material, heptylviologen bromide. Typical operating voltages are about 1.0 V.

The ECD cell mainly comprises a glass substrate 24, a counter electrode 26, display electrodes 28, a viologen mixture liquid 30, and a spacer 32.

Although the operating principle of ECDs has been discussed above, ECDs have the following characteristic features:
 (1) the viewing angle is extremely wide
 (2) a plurality of colors are selectable
 (3) for a single cycle of coloration/bleaching the power dissipation is several through several tens $mj/cm^2$, and the total power dissipation is proportional to the number of the repetion cycles
 (4) memory effects are expected, which maintains the coloration state for several hours through several days after the coloration voltage is removed as long as ECDs are held in an electrically opened state. Of course, the memory effects require no externally supplied power.

In the above-mentioned ECDs, the distance between the display electrode and the counter electrode should be strictly fixed to a predetermined length in order to enhance the visibility. The preferred distance is 0.1 through 3.0 mm.

In order to provide a fixed distance between the display electrode and the counter electrode, in accordance with the present invention, one of the substrates is dish shaped having a bottom and raised portion which forms an inner concave surface and is attached to the other substrate at the periphery, or, the raised portion of the dish shaped substrate.

Figures 3, 4:
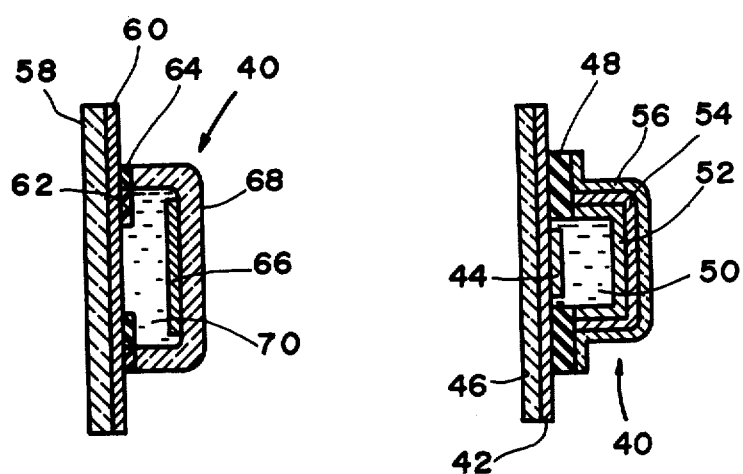
FIG. 3 is a cross-sectional view of an embodiment of an electrochromic display cell of the present invention.
FIG. 4 is a cross-sectional view of another embodiment of an electrochromic display cell of the present invention.
Figure 5:
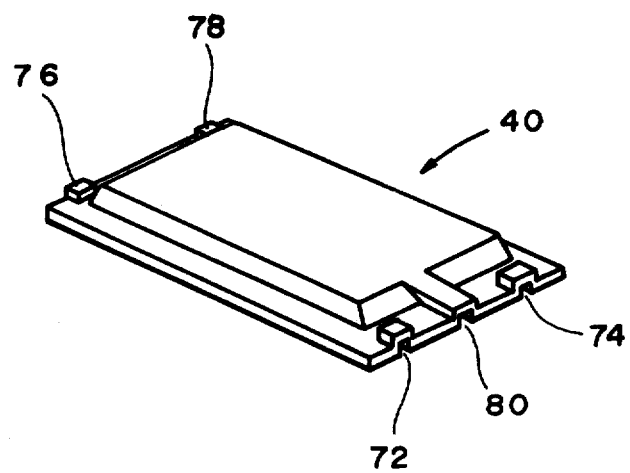
FIG. 5 is a perspective view of a dish shaped substrate for use in an electrochromic display cell of the present invention.

FIG. 3 shows an embodiment of the ECD cell of the present invention, wherein the $WO_3$ film is used as the inorganic solid film.

A transparent, conductive indium oxide film 42 and a $WO_3$ film 44 are formed on a flat substrate 46 made of soda glass. A counter substrate 56 is made of glass, ceramics, metal or plastics, and is dish shaped through the use of conventional heat treatment or mechanical treatment. A transparent, conductive indium oxide film 54 and a $WO_3$ film 52 are formed on the inner surface of the dish shaped substrate 56. The dish shaped substrate 56 is attached to the flat substrate 46 via adhesive 48 (R2401 and HC-11 by Somal Kogyo KK). Thereafter, an electrolyte 50 is impregnated into a cavity defined by the flat substrate 46, the dish shaped substrate 56 and the adhesive 48.

FIG. 4 shows another embodiment of the ECD cell of the present invention, which utilizes an electrically-induced chemical reduction of a colorless liquid including the EC material such as heptylviologen bromide.

The ECD cell of FIG. 4 comprises a flat glass substrate 58, a transparent, conductive NESA film 60 formed on the flat glass substrate 58, an insulation film 62, an adhesion film 64, a dish shaped glass substrate 68, a transparent, conductive NESA film 66 formed on the inner surface of the dish shaped glass substrate 68, and a heptylbromide mixture 70.

It will be clear that the embodiments of FIGS. 3 and 4 do not require the spacer to determine the cavity for the electrolyte.

FIGS. 5 through 8 show the dish shaped substrate 40 in detail.

Figure 6:
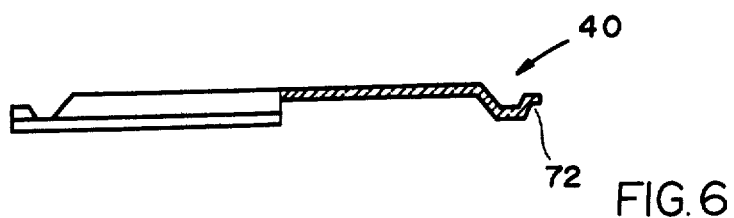
FIG. 6 is a partially sectional view showing a groove for electrical connection included within the dish shaped substrate of FIG. 5.
Figure 7:
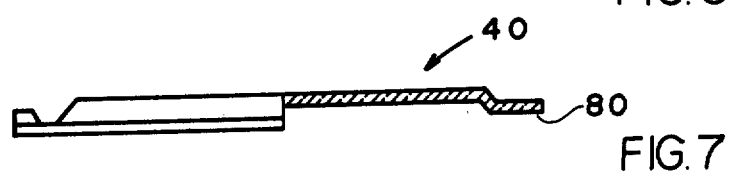
FIG. 7 is a partially sectional view showing another groove for electrolyte impregnation purposes included within the dish shaped substrate of FIG. 5.
Figure 8:
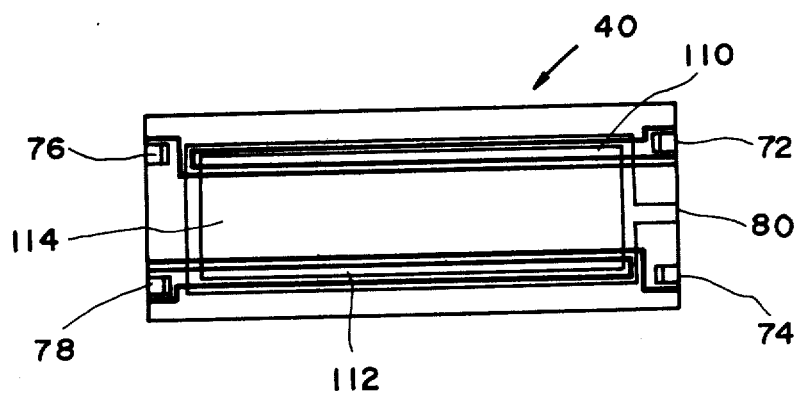
FIG. 8 is a rear view of the dish shaped substrate of FIG. 5.

Four grooves 72, 74, 76 and 78 are formed at the periphery, or, the raised portion of the dish shaped substrate 40. FIG. 6 shows the groove 72. Another groove 80 is formed at the periphery, or, the raised portion of the dish shaped substrate 40. FIG. 7 shows the groove 80 through which the electrolyte is impregnated. FIG. 8 shows the inner surface of the dish shaped substrate 40. Reference electrodes 110 and 112, and a counter electrode 114 are formed on the inner surface of the dish shaped substrate 40. The groove 72 is associated with the reference electrode 110, the groove 78 is associated with the reference electrode 112, and the grooves 74 and 76 are associated with the counter electrode 114.

Figure 9:
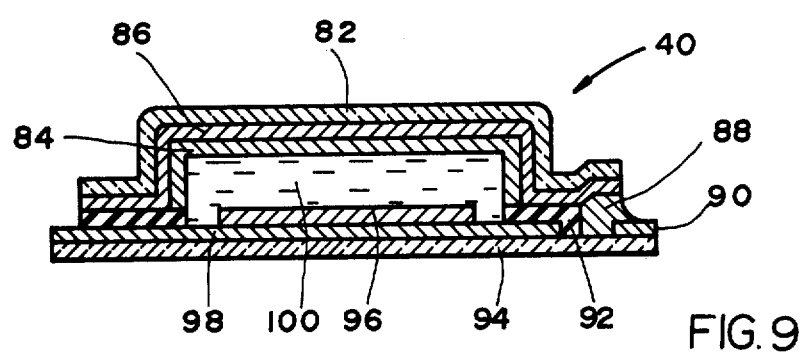
FIG. 9 is a cross-sectional view of an electrochromic display cell employing the dish shaped substrate of FIG. 5.

FIG. 9 is a cross-sectional view showing a solid state ECD employing the dish shaped substrate 40. FIG. 9 specifically shows the construction where the groove 72 is formed.

A $WO_3$ film 84 and a transparent, conductive indium oxide film 86 are formed on the inner surfaces of a dish shaped glass substrate 82. The $WO_3$ film 84 and the indium oxide film 86 function as the reference electrode 110 (see FIG. 8). Another $WO_3$ film 96 and an indium oxide film 98 are formed on a flat glass substrate 94. Still another indium oxide film 90 is formed on the flat glass substrate 94 at the periphery thereof. The thus formed two glass substrates 82 and 94 are attached to each other via an adhesion layer 92 made of SE 1700 by Toray Silicone KK so as to define a cavity therebetween with the opposing surfaces thereof forming parallel walls of the cavity.

After the adhesion layer 92 is fixed, an electrolyte 100 is impregnated through the groove 80. The electrolyte 100 includes γ-butyrolactone and litium perchlorate. After completion of the impregnation, the groove 80 is blocked by metal filler such as In, Pb, or suitable resin. In a preferred form, the groove 80 is tapered so as to prevent the impregnation of the filler into the cavity.

A conductive adhesive 88 is filled in the groove 72 in such a manner as to be connected to the reference electrode 110, or, the indium oxide film 86. The indium oxide film 90 formed on the flat glass substrate 94 is also connected to the conductive adhesive 88, whereby the terminal for the reference electrode 110 is formed on the flat glass substrate 94. In this way, terminals for the counter electrode and the reference electrodes, which are formed on the inner surface of the dish shaped glass substrate 82, are formed on the flat glass substrate 94.

The flat glass substrate 94 is slightly larger than the dish shaped substrate 82 and, therefore, the electrodes 90 and 98 are slightly extended from the periphery of the dish shaped substrate 82 in order to facilitate the electrical connection between the ECD cell and a driver circuit.

Figure 10:
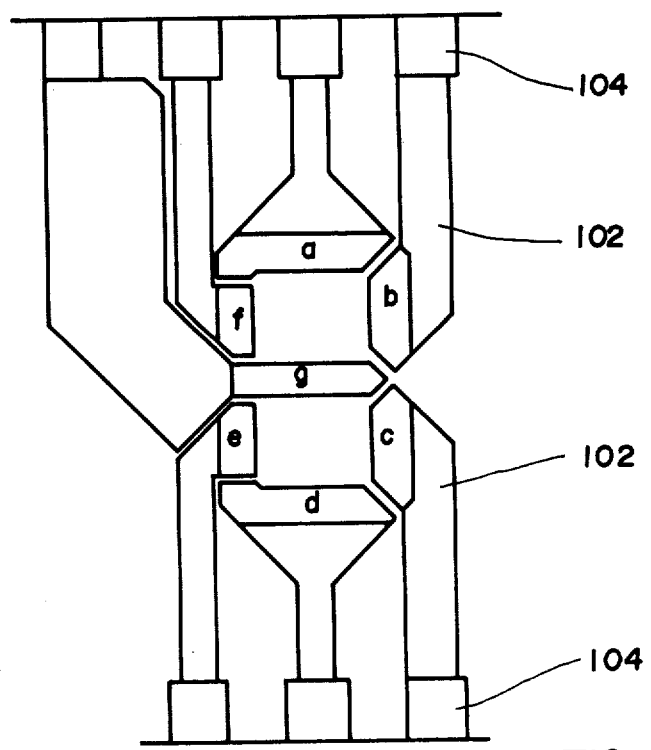
FIG. 10 is a layout of a typical segment pattern of an electrochromic display cell of the present invention.

In a preferred form, the terminals for the counter electrode and the reference electrodes are formed at the longitudinal edges of the ECD cell. And terminals for display segments are formed at the side edges of the ECD cell. FIG. 10 shows a typical segment pattern. Terminals 104 are connected to display segments a through g via lead electrodes 102. The terminals 104, the lead electrodes 102 and the display segments a through g are formed on the flat glass substrate 94.

The invention being thus described, it will be obvious that the same may be varied in many ways. Such variations are not to be regarded as a departure from the spirit and scope of the invention, and all such modifications are intended to be included within the scope of the following claim.

What is claimed is:

1. An electrochromic display device comprising in combination:
    a first flat substrate having a display selection electrode formed on one surface thereof;
    a second dish shaped substrate with a bottom and raised portion having a counter or reference electrode formed on the inner concave surface thereof;
    said substrates being attached to each other by a conductive adhesive at the peripherally raised portion of said dish shaped substrate so as to define a cavity therebetween with the respective opposing surfaces of said electrodes forming parallel walls of said cavity, and the distance between said display electrode and counter or reference electrode being substantially defined by the depth of said dish shaped substrate at a fixed, predetermined length;
    a transfer terminal provided at the periphery of said first flat substrate for connecting the electrode disposed on said dish shaped substrate to a power source via said conductive adhesive; and
    a groove for introducing an electrolyte into said cavity.

* * * * *